SELF-EXTINGUISHING POLYAMIDE MOULDING COMPOSITIONS

Karl Heinz Hermann, Krefeld Bockum, Germany, assignor to Bayer Aktiengesellschaft, Leverkusen, Germany
No Drawing. Filed Sept. 23, 1971, Ser. No. 183,267
Claims priority, application Germany, Sept. 23, 1970,
P 20 46 832.0
Int. Cl. C08g 51/06, 51/10, 51/56
U.S. Cl. 260—37 N  2 Claims

ABSTRACT OF THE DISCLOSURE

Self-extinguishing polyamide moulding compositions comprising a polyamide and as flame-retarding additives 0.5 to 25% by weight of at least one halogen-containing tin compound.

---

This invention relates to self-extinguishing, non-dripping polyamide moulding compositions which contain halogen containing tin compounds as flame-retarding additives.

Polyamides are regarded as difficultly inflammable thermoplastic resins and, acording to ASTM D 635, they are even classified as self-extinguishing. Polyamides which contain fillers, on the other hand, particularly those which are reinforced with glass fibres, are combustible because the filler obviously acts as a wick. The combustibility of polyamides which contain fillers cannot be substantially reduced by the addition of the usual flame-retarding substances such as organic halogen compounds, antimony compounds or phosphorus compounds. Moreover, many of these compounds are not stable at the temperatures employed for the production and processing of filled polyamides in screw extruders or injection moulding machines and therefore give rise to decomposition phenomena and to discolouration.

It has now been found that the combustibility of polyamides and particularly of polyamides which contain fillers can be substantially reduced by the addition of one or more halogen-containing tin compounds. One special advantage of halogen-containing tin compounds is that they not only reduce combustibility, i.e. they cause ignited parts to extinguish within a very short time, but they also prevent dripping of parts exposed to flames.

This invention therefore relates to self-extinguishing polyamide moulding compositions which are non-dripping when exposed to fire, comprising a polyamide and, as flame-retarding additives, 0.5 to 25% by weight, based on the polyamide moulding compounds, of at least one halogen-containing tin compound.

The quantity of halogen-containing tin compound added is advantageously 2–20% by weight, based on the polyamide or the mixture of polyamide and filler.

Examples of suitable halogen-containing tin compounds are tin halides of fluorine, chlorine, bromine and iodine, such as $SnF_2$, $SnCl_2$, $SnBr_2$, $SnI_2$, $SnCl_4$, $SnBr_4$, $SnI_4$ and organo-tin compounds of the general formula $$R_nSnX_{4-n}$$

in which
R represents a substituted or unsubstituted alkyl radical with 1 to 10 carbon atoms, acycloalkyl radical with 5–10 carbon atoms, an aryl radical with 6–20 carbon atoms or an aralkyl radical with 7–20 carbon atoms
X represents a halogen atom such as chlorine, bromine, iodine and
n represents the integer 1, 2 or 3, e.g. trimethyl tin iodide, triethyl tin chloride, triethyl tin iodide, tributyl tin chloride, tributyl tin bromide, triphenyl tin chloride, dipropyl tin diiodide, diisopropyl tin diiodide, dibutyl tin dichloride, dibutyl tin diiodide, diisobutyl tin dichloride, diisobutyl tin dibromide, diisobutyl tin diiodide, diisopentyl tin dichloride, diisopentyl tin dibromide, diisopentyl tin diiodide, dihexyl tin dibromide, dicyclohexyl tin diiodide, dioctyl tin dichloride, dioctyl tin dibromide, didecyl tin dichloride, didecyl tin dibromide, didodecyl tin diiodide, methyl tin triiodide and butyl tin tribromide.

It may in some cases be advantageous to use a mixture of two different halogen-containing tin compounds, e.g. an inorganic tin halide such as $SnCl_2$ and an organo tin halide compound such as dibutyl tin dichloride or dioctyl tin dichloride.

Polyamides within the meaning of this invention are of the general type described in U.S. Pats. 2,071,250; 2,071,253; 2,130,948 and 3,015,652, such as homopolyamides which are obtained by polymerisation of aminocarboxylic acids and/or their lactams, e.g. ε-aminocaproic acid, 11-aminoundecanoic acid, 4,4-dimethyl acetidinone, β-pyrrolidone, ε-caprolactam, enantholactam, caprylolactam or lauric lactam. Polyamides are suitable which are obtained by polycondensatino of diamines, e.g. ethylenediamine, hexamethylenediamine, decamethylenediamine, dodecamethylenediamine, 2,2,4- or 2,4,4-trimethylhexamethylenediamine, p- or m-xylylenediamine, bis-(4-amino-cyclohexyl)methane, 3-aminomethyl-3,5,5-trimethylcyclohexylamine or 1,4-diamino-methylcyclohexane with dicarboxylic acids, e.g. oxalic acid, adipic acid, sebacic acid, heptadecane dicarboxylic acid, 2,2,4- or 2,4,4-trimethyl-adipic acid, isophthalic acid or terephthalic acid. Copolyamides which are obtained by polymerisation or polycondensation of several of the above mentioned components are also used.

In addition to the flame-retarding additives, the polyamides may contain the usual additives such as pigments, dyes, light and heat stabilisers, stabilisers against weathering, optical brightening agents, plasticisers, nucleating agents, chain-terminating agents, lubricants and mould release agents and special fillers such as kaolin, glass fibres or asbestos fibres, chalk, talcum, quartz powder, carbon fibres, mica or feldspar.

The halogen-containing tin compounds may be mixed with a polyamide melt, with or without fillers, by means of the usual mixing apparatus such as stirrers, kneaders or extruders after the poymerisation or polycondensation which is carried out in the usual manner in continuously or intermittently operating reaction apparatus. Preferably, however, the halogen-containing tin compounds fed into the feed hopper of a screw extruder together with the granular or pulverulent polyamide, if desired after having first been mixed with the polyamide, and the polyamide is then melted and a homogeneous mixture prepared at the same time. If fillers such as glass fibres are also used, they may be introduced through the feed hopper together with the tin halogen compounds and polyamides or they may be introduced separately into the screw extruder through a suitable aperture, e.g. a degasification pipe. It is also possible, and sometimes advantageous to carry out the mixing of polyamides with fillers and halogen-containing tin compounds in two stages. In this case, the polyamide is first mixed with one of the components by a screw extrusion operation and the resulting mixture is then mixed with the second component in a second screw extrusion operation.

The fire resistance of the polyamide moulding compounds produced with the additives according to the invention is tested as follows:

10 test samples measuring 60 mm. x 12 mm. x 4 mm. are 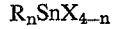 prepared in a conventional injection moulding apparatus. These freshly moulded samples are clamped vertically, the clamping device clamping the top end of the sample. The lower, free end is then ignited by exposing it for 15 seconds to a blue Bunsen-burner flame 19 mm. high, using a Bunsen-burner without cone. The flame is then removed and the length of time during which the sample continues to burn is measured. If the "after-burning time" is less than 30 seconds, the lower end of the sample is ignited for a second time with the same Bunsen-burner flame for 15 seconds and the "after-burning time" until extinction is again measured. The shortest and the longest "after-burning time" and the average value for the 10 samples are recorded.

In addition to the test for the "after-burning time," the samples are tested to see whether the material drips.

EXAMPLE 1

3.5 kg. of colourless polycaprolactam produced by the usual process and having a relative viscosity of 3.12 (determined on a 1% solution in m-cresol at 25° C. in an Ubbelohde viscosimeter) are melted in a conventional screw extruder and at the same time mixed homogeneously with 1.5 kg. of glass fibres (original fibre length 6 mm., fibre diameter 0.01 mm.) and various flame-retarding additives. The glass fibre reinforced polyamide is spun as a wire of about 3 mm. in diameter, chopped up into granules and dried. The products are moulded in a conventional commercial injection extrusion apparatus to produce standard test samples which are tested to determine the flexural strength according to DIN 53 452 and the impact strength according to DIN 53 453.

In addition, the samples are tested for their flame resistance as described above.

The results of the various tests and the values found for the test samples are summarised in Table 1. Test 6 is a comparison test carried out on a sample without flame retarding additive.

EXAMPLE 2

3.5 kg. of conventionally produced glass fibre-reinforced polyhexamethylene adipamide ("nylon-66") having a relative viscosity of 3.01 (measured on a 1% solution in m-cresol at 25° C. in an Ubbelohde viscosimeter, taking into account the glass fibre content by using a correspondingly higher weight of sample) and a glass fibre content of 33.8% by weight (measured by ashing at 700° C.–800° C.) are melted in a conventional screw extruder and at the same time homogeneously mixed with 350 g. (10% by weight) of $SnCl_2$. The polyamide melt is then spun as a wire of about 3 mm. in diameter, chopped up into granules and dried. The product is moulded in a conventional injection extrusion apparatus to produce suitable test samples which are then tested for their flame resistance as described above.

1ST IGNITION

"After-burning time:"

|  | Seconds |
|---|---|
| Minimum | 5 |
| Maximum | 16 |
| Average value | 10 |

2ND IGNITION

"After-burning time:"

|  | Seconds |
|---|---|
| Minimum | 1 |
| Maximum | 10 |
| Average value | 5 |

In a comparison test carried out without the addition of $SnCl_2$, the test samples burn down completely.

EXAMPLE 3

A glass fibre-reinforced copolyamide of 90% by weight of caprolactam and 10% by weight of hexamethylene diammonium adipate ("AH-salt") having a relative viscosity of 3.30 and a glass fibre content of 34.7% by weight based on the mixture containing glass fibres is mixed with 7.5% by weight of $SnCl_2$ in the same way as described

TABLE I

| Serial No. | Additive | Grams | Weight (percent[1]) | Additive II | Grams | Weight (percent) | Flexural strength, kg.wt./cm.² | Impact strength, cm. kg. Impact wt./cm.² | 1st ignition "After-burning time" Minimum, seconds | Maximum, seconds | Value, seconds | Remarks | 2d ignition "After-burning time" Minimum, seconds | Maximum, seconds | Average Value, seconds | Remarks |
|---|---|---|---|---|---|---|---|---|---|---|---|---|---|---|---|---|
| 1 | $SnCl_2$ | 375 | 7.5 | | | | 2,287 | 46.3 | 2 | 11 | 7 | Does not drip | 2 | 9 | 6 | Does not drip. |
| 2 | $SnCl_2$ | 500 | 10 | | | | 2,241 | 41.2 | 0 | 5 | 2 | do | 1 | 5 | 3 | Do. |
| 3 | $SnBr_2$ | 500 | 10 | | | | 2,196 | 43.7 | 0 | 3 | 1 | do | 0 | 4 | 2 | Do. |
| 4 | Dibutyl tin dichloride | 375 | 7.5 | | | | 2,386 | 47.0 | 7 | 35 | 18 | do | 5 | 26 | 14 | Do. |
| 5 | do | 325 | 6.5 | $SnCl_2$ | 175 | 3.5 | 2,275 | 45.6 | 3 | 25 | 12 | do | 3 | 18 | 10 | Do. |
| 6 | | | | | | | 2,301 | 46.0 | | | | Burns completely down with dripping | | | | |

[1] Based on the glass fibre-reinforced polyamide.

in Example 2. The results obtained in the flame resistance test is as follows:

1ST IGNITION

"After-burning time:"

| | Seconds |
|---|---|
| Minimum | 0 |
| Maximum | 4 |
| Average value | 2 |

2ND IGNITION

"After-burning time:"

| | Seconds |
|---|---|
| Minimum | 2 |
| Maximum | 6 |
| Average value | 3 |

In a comparison test carried out without the addition of $SnCl_2$, the samples burn down completely.

I claim:

1. A self-extinguishing polyamide moulding composition which does not drip when exposed to flames, comprising a polyamide, at least one filler selected from the group consisting of kaolin, glass fibers, asbestos fibers, chalk, talcum, quartz powder, carbon fibers, mica and feldspar and 0.5 to 25% by weight based on the polyamide of a stannous halide.

2. A self-extinguishing polyamide moulding composition according to claim 1, containing additional fillers.

References Cited

UNITED STATES PATENTS

| | | | |
|---|---|---|---|
| 3,189,575 | 6/1965 | Horn et al. | 260—45.75 |
| 3,280,053 | 10/1966 | Twilley et al. | 260—45.75 |
| 3,067,168 | 12/1962 | Purdon | 260—45.75 |
| 3,239,482 | 3/1966 | Rapp | 260—45.75 |
| 3,382,209 | 5/1968 | Deichert | 260—45.75 |
| 3,598,693 | 8/1971 | Andersen | 260—37 |

DONALD E. CZAJA, Primary Examiner

V. P. HOKE, Assistant Examiner

U.S. Cl. X.R.

260—45.75 K